United States Patent
Lee et al.

(10) Patent No.: US 8,866,438 B2
(45) Date of Patent: Oct. 21, 2014

(54) SYSTEM AND METHOD FOR PROVIDING REACTIVE POWER USING ELECTRIC CAR BATTERY

(75) Inventors: Kil Su Lee, Seoul (KR); Jeong Hwan Yang, Busan (KR); Sang Hyun Park, Daejeon (KR)

(73) Assignee: SK Innovation Co., Ltd. (KR)

( * ) Notice: Subject to any disclaimer, the term of this patent is extended or adjusted under 35 U.S.C. 154(b) by 353 days.

(21) Appl. No.: 13/310,030

(22) Filed: Dec. 2, 2011

(65) Prior Publication Data

US 2012/0139488 A1 Jun. 7, 2012

(30) Foreign Application Priority Data

Dec. 3, 2010 (KR) .................. 10-2010-0122532

(51) Int. Cl.
*H02J 7/00* (2006.01)
*H02J 7/04* (2006.01)
*H02J 3/18* (2006.01)
*B60L 11/18* (2006.01)
*H02J 11/00* (2006.01)

(52) U.S. Cl.
CPC .......... *H02J 3/1842* (2013.01); *Y02T 10/7088* (2013.01); *Y02E 40/22* (2013.01); *B60L 11/1809* (2013.01); *Y02T 90/14* (2013.01); *Y02E 60/721* (2013.01); *B60L 11/1838* (2013.01); *B60L 11/1842* (2013.01); *Y02T 90/163* (2013.01); *H02J 11/00* (2013.01); *Y04S 10/126* (2013.01); *Y02T 90/16* (2013.01); *Y02T 90/128* (2013.01); *Y02T 10/7005* (2013.01); *B60L 11/1812* (2013.01)

USPC ...................... 320/109; 320/104; 320/107

(58) Field of Classification Search
USPC .................... 320/109, 104, 107, 137
See application file for complete search history.

(56) References Cited

U.S. PATENT DOCUMENTS

| | | | |
|---|---|---|---|
| 7,058,484 B1 * | 6/2006 | Potega ........................ 700/297 |
| 7,256,516 B2 * | 8/2007 | Buchanan et al. ............. 307/62 |
| 2008/0157593 A1 * | 7/2008 | Bax et al. ..................... 307/10.1 |
| 2009/0030712 A1 * | 1/2009 | Bogolea et al. ................. 705/1 |
| 2009/0066287 A1 * | 3/2009 | Pollack et al. ................ 320/101 |
| 2010/0017249 A1 * | 1/2010 | Fincham et al. ................. 705/8 |
| 2010/0244773 A1 * | 9/2010 | Kajouke ...................... 320/137 |
| 2011/0231044 A1 * | 9/2011 | Fassnacht ..................... 701/22 |
| 2012/0112693 A1 * | 5/2012 | Kusch et al. .................. 320/109 |

FOREIGN PATENT DOCUMENTS

| | | |
|---|---|---|
| JP | 08163787 | 6/1996 |
| JP | 2006067760 | 3/2006 |
| JP | 2010512727 | 4/2010 |
| KR | 10-2011-0062945 | 6/2011 |
| WO | 2008073453 | 6/2008 |

* cited by examiner

*Primary Examiner* — Edward Tso
*Assistant Examiner* — Alexis A Boateng
(74) *Attorney, Agent, or Firm* — Cantor Colburn LLP (57) ABSTRACT

Provided are a system and a method for providing reactive power using an electric car battery, and more particularly, a system and a method for providing reactive power to a microgrid using a bidirectional charger that is an electric car battery and an electric car charging device.

2 Claims, 5 Drawing Sheets

SYSTEM AND METHOD FOR PROVIDING REACTIVE POWER USING ELECTRIC CAR BATTERY

CROSS-REFERENCE TO RELATED APPLICATIONS

This application claims priority under 35 U.S.C. §119 to Korean Patent Application No. 10-2010-0122532, filed on Dec. 3, 2010, in the Korean Intellectual Property Office, the disclosure of which is incorporated herein by reference in its entirety.

TECHNICAL FIELD

The present invention relates to a system and a method for providing reactive power using an electric car battery, and more particularly, to a system and a method for providing reactive power to a micro-grid using a bidirectional charger that is an electric car battery and an electric car charging device.

BACKGROUND

Technologies for using power of an electric car, or the like, have been proposed. An example of Prior Documents disclosing these proposed technologies may include KR Laid-Open Patent No. 10-2009-0119833, or the like.

The methods disclosed in these Prior Documents are a type that uses the integrated power of the electric car, or the like. Describing in detail, the methods are a type that combines each of the electrical resources with the corresponding bridges and connects it with the power grid (referred to as a grid).

However, according to the above-mentioned methods, when the plurality of electric cars is simultaneously charged, a problem occurs in that the reactive power is insufficient. Therefore, when reactive power is insufficient, transmission efficiency of power is reduced and voltage is reduced in the grid. Because of insufficient reactive power, voltage is further reduced due to the reactive power, which may ultimately lead to black-out.

Therefore, apparatuses, such as a synchronous compensator that is a reactive power compensation device, a shunt capacitor, a flexible AC transmission system (FACTS), or the like, have been used.

According to the related art, the expensive reactive power compensation device needs to be mounted in the grid in order to avoid the black-out, which may lead to much cost.

SUMMARY

An embodiment of the present invention is directed to providing a system and a method for providing reactive power using an electric car battery capable of stably and efficiently supplying necessary reactive power to a micro-grid so as not to cause a reactive power shortage phenomenon.

Another embodiment of the present invention is directed to providing a system and a method for providing reactive power using an electric car battery capable of increasing grid stability by supplying and absorbing the reactive power to and in a micro-grid without mounting an expensive reactive power compensation device in the grid.

In one general aspect, there is provided a system for providing reactive power using an electric car battery, including: a high-voltage battery for a hybrid car, a plug-in hybrid car, or an electric car connected with outlets mounted in a home; a power factor monitoring controller receiving status information on the high-voltage battery generated from a battery management system (BMS) included in the cars or the electric car through a communication unit included in the cars or the electric car and monitoring a power factor for at least one load mounted in the home and the high-voltage battery to calculate a power factor compensation value; a bidirectional charger supplying power to the high-voltage battery or send the power from the high-voltage battery to the outside; and a control unit controlling the bidirectional charger to send the power from the high-voltage battery to the outside as much as the calculated power factor compensation value, thereby compensating for the power as much as the power factor compensation value.

The system for providing reactive power may further include a micro-grid that supplies power to the bidirectional charger or receives the power of the high-voltage battery from the bidirectional charger.

In another general aspect, there is provided a method for providing reactive power using an electric car battery, including: connecting a high-voltage battery for a hybrid car, a plug-in hybrid car, or an electric car with outlets mounted in a home; calculating a power factor compensation value by allowing a power factor monitoring controller to receive status information on the high-voltage battery generated from a battery management system (BMS) included in the cars or the electric car through a communication unit included in the cars or the electric car and monitor a power factor for at least one load mounted in the home and the high-voltage battery; supplying power to the high-voltage battery or send the power from the high-voltage battery to the outside by a bidirectional charger; and controlling, by a control unit, the bidirectional charger to send the power from the high-voltage battery to the outside as much as the calculated power factor compensation value, thereby compensating for the power as much as the power factor compensation value.

The method for providing reactive power may further include supplying power to the bidirectional charger or receiving the power of the high-voltage battery from the bidirectional charger by a micro-grid.

The bidirectional charger, which is an on-board charger, may include a power factor control (PFC) circuit.

The power supply of the high-voltage battery may be used as a leading load.

DETAILED DESCRIPTION OF EMBODIMENTS

Although the present invention can be modified variously and have several embodiments, the exemplary embodiments are illustrated in the accompanying drawings and will be described in detail in the detailed description. However, the present invention is not limited to the specific embodiments and should be construed as including all the changes, equivalents, and substitutions included in the spirit and scope of the present invention.

Further, terms used in the specification, 'first', 'second', etc. can be used to describe various components, but the components are not to be construed as being limited to the terms. The terms are only used to differentiate one component from other components. For example, the first component may be called the second component without departing from the scope of the present invention. Likewise, the second component may be called the first component. The term 'and/or' includes a combination of a plurality of items or any one of a plurality of terms.

In the case it is stated that any components are "connected" or "coupled" to other components, it is to be understood that the components may be directly connected or coupled to other components, but there is another component therebetween. On the other hand, in the case that it is stated that any components are "directly connected" or "directly coupled" to other components, it is to be understood that there is no another component therebetween.

The terms used in the specification are used to describe only specific embodiments and are not intended to limit the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless indicated otherwise, it is to be understood that all the terms used in the specification including technical and scientific terms has the same meaning as those that are understood by those who skilled in the art. It must be understood that the terms defined by the dictionary are identical with the meanings within the context of the related art, and they should not be ideally or excessively formally defined unless the context clearly dictates otherwise.

Hereinafter, a system and a method for providing reactive power using a battery and a bidirectional charger for an electric car according to an exemplary embodiment of the present invention will be described in detail with reference to the accompanying drawings.

Figure 1:
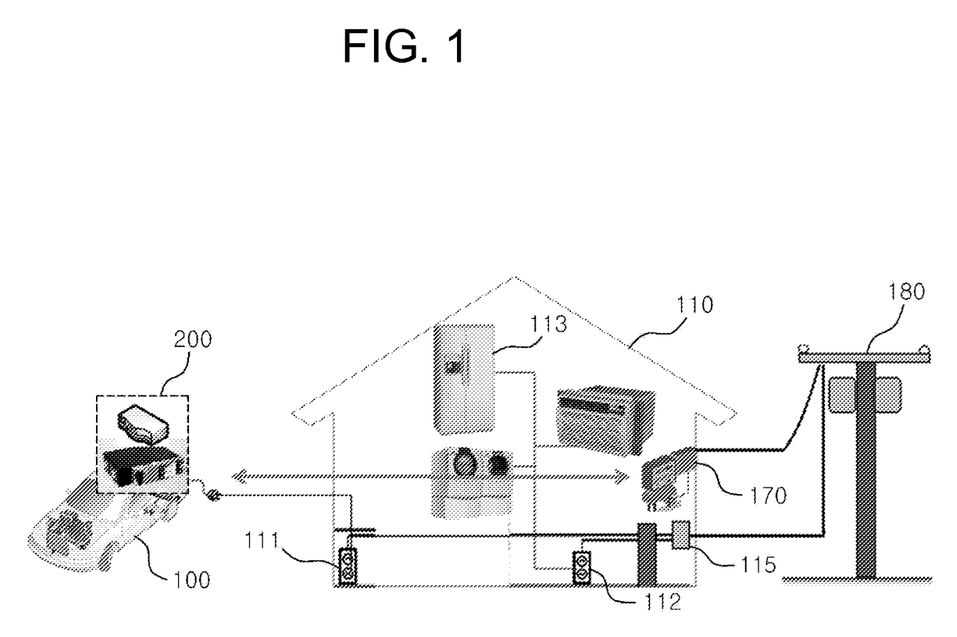
FIG. 1 is a configuration diagram of a system for providing reactive power using a battery and a bidirectional charger for an electric car according to an exemplary embodiment of the present invention.

FIG. 1 is a configuration diagram of a system for providing reactive power using a battery and a bidirectional charger for an electric car according to an exemplary embodiment of the present invention. Referring to FIG. 1, a system for providing reactive power is configured to include a car 100, a charging operation unit 200 mounted in the car 100, a power factor monitoring controller 170 connected with the charging operation unit 200 and monitoring a power factor for reactive power of the car 100, a micro-grid 180 connected with the power factor monitoring controller 170 and receiving the reactive power in the car 100, or the like.

Figure 2:
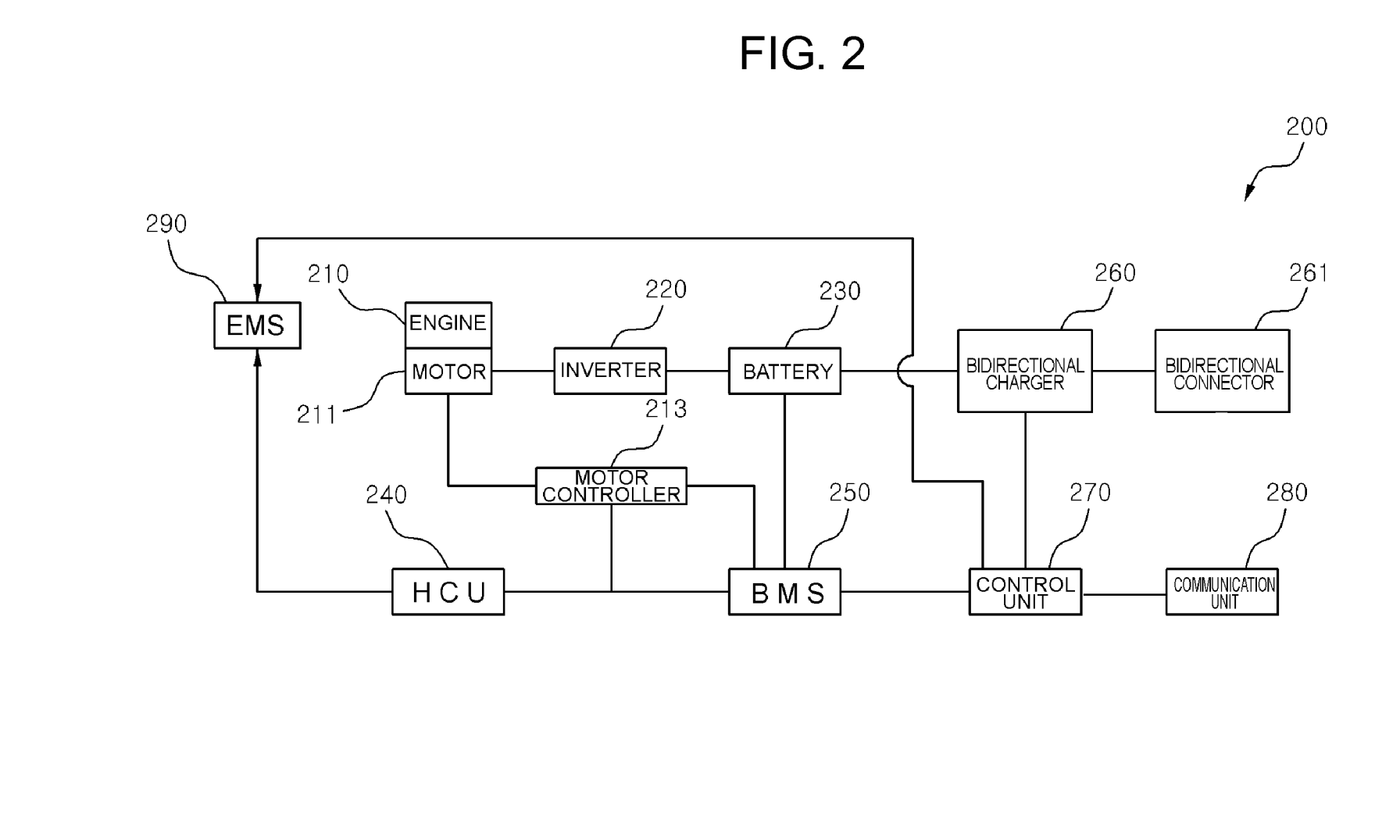
FIG. 2 is a configuration diagram of a system for a car shown in FIG. 1.

The car 100 may be a hybrid car, a plug-in hybrid car, or an electric car that uses a battery as a power supply. The car 100 is mounted with the charging operation unit 200. Meanwhile, FIG. 2 shows a configuration diagram of an electronic system of the car 100 including the charging operation unit. FIG. 2 will be described below.

The charging operation unit 200 is connected with outlets 111 and 112 mounted in a home 110 to receive power from the micro-grid 180 or is connected with the power factor monitoring controller 170 to transmit the reactive power generated from the battery (not shown) of the car 100 to the power factor monitoring controller 170. In this case, the communication between the charging operation unit 200 and the power factor monitoring controller 170 may use a power line control (PLC), a controller area network (CAN), or the like.

The power factor monitoring controller 170 that is referred to as an automatic power factor controller, an automatic power factor control device, or the like is an apparatus that closes or opens a capacitor according to a setting value of the reactive power or the power factor. In addition, the power factor monitoring controller 170 is a device that can prevent a burden for additional fees due to the reduction in the power factor, suppress the fluctuation in voltage and the occurrence in harmonics, and save energy. The power monitoring controller 170 is connected with home appliances 113 through a car 100 and a panel board 115. The home appliances 113 are a load in a home.

Generally, a representative method for saving energy may be a peak demand control for controlling peak power so as to prevent an instantaneous power shortage phenomenon and a power factor control for controlling a leading reactive capacitor so as to minimize the reactive power.

Voltage or current of an AC circuit is fluctuated in a sinusoidal wave (sine wave) shape and thus, the phases of sinusoidal waves of voltage and current may not necessarily coincide with each other. In this case, a phase difference between voltage and current occurs and thus, a power value represented by VI is represented by $VI*\cos\theta$=effective power (where I* is represented by complex current). In this case, $\cos\theta$ becomes a power factor. The power factor represents efficiency of the supplied power that is actually used for work.

Referring to FIG. 1, an example of a control method of the power factor monitoring controller 170 may include a loop control, a sequential control (a priority control), or the like, depending on a C/k value. Here, a C/k value (smallest capacitor current) means a ratio of the smallest capacitor capacity to grid rated voltage and current or current of the smallest capacitor capacity.

The structure and configuration of the power factor monitoring controller 170 have been known well and therefore, the description thereof will be omitted.

The micro-grid 180 is configured to include a fuel cell that can independently control the effective and reactive power for providing high quality of power and micro-sources adopting an eco-friendly and reliable power source like a micro turbine. Further, the micro-grid 180 is a local power supply system based on an independent distributed power supply from the existing wide area power system. Further, the exemplary embodiment of the present invention describes a micro-grid, but may be a smart grid.

The micro-grid 180 is connected to the panel board 115 mounted in the home 110 to supply commercial power to the car 100, the home appliances 113, or the like, through the outlets 111 and 112. In this case, an example of the home appliances may include a washing machine, a refrigerator, an air conditioner, or the like.

Further, the micro-grid 180 may be connected with the power factor monitoring controller 170 to receive the reactive power of the car 100.

FIG. 2 is a configuration diagram of the system for the car 100 shown in FIG. 1. In particular, FIG. 2 shows a configuration of a system for a hybrid car. Referring to FIG. 2, the system configuration diagram is configured to include an engine 210 and a motor 211 as a driving source for traveling a car, an inverter 220 for inverting a driving source from the engine to the motor, a high-voltage battery 230 that is a hybrid battery, a bidirectional charger 260 that supplies voltage to the high-voltage battery 230 or supplies the reactive power of the high-voltage battery 230 to the power factor monitoring controller (170 of FIG. 1), a battery management system (BMS) 250 that controls the high-voltage battery 230, and a control unit 270 that controls the BMS 250 and the bidirectional charger 260, or the like.

Further, although FIG. 2 shows the direct connection of the engine 210 and the motor 211, this may be separately configured as being shown for the convenience of understanding of the exemplary embodiment of the present invention.

Components will be described with reference to FIG. 2.

The engine management system (EMS) 290 may serve to integrate and manage the engine 210 and exert the optimal traveling performance of the car by controlling the injection, the ignition timing, or the like, of an optimal liquid fuel level based on a signal input from various sensors sensing an operating state of the engine 210.

The inverter 220 serves to change DC power to 3-phase AC power so as to drive the motor and may generally include a switching device (not shown) and an insulated gate bipolar transistor (IGBT) according to a pulse width modulation (PWM) manner and a gate driver (not shown) applying a signal to the switching device. This is for the convenience of understanding of the exemplary embodiment of the present invention and therefore, any component providing power to the motor 211 by inverting the power from the high-voltage battery 230 can be used.

The high-voltage battery 230, which is a hybrid battery such as a nickel metal battery, a lithium ion battery, or the like, serves to supply power to the motor 211. Further, the exemplary embodiments of the present invention show only the battery for the convenience of understanding but may be a pack configured by battery cells arranged in series or in parallel and may be configured by several sub packs.

The BMS 250 serves to manage and control the high-voltage battery 230 and transmit the status information of the high-voltage battery 230 to the control unit 270.

A hybrid control unit (HCU) 240 serves to exchange control information among an EMS 290, the BMS 250, and the control unit 270 so as to control the car. That is, when the engine 210 is operated, the HCU 240 exchanges the control information on the engine 210 with the EMS 290 to control the engine 210. On the other hand, when the motor 211 is operated, the motor controller 213 exchanges the control information on the motor 211 and the high-voltage battery 230 with the BMS 250.

The motor controller 213 exchanges the control information between the HCU 240 and the BMS 250 so as to control the motor 211. In addition, in order to control the revolutions per minute (RPM) of the motor 211, the information on the revolutions per minute of the motor 211 is acquired from the motor 211 and the information is used to control the motor 211. Further, the exemplary embodiment of the present invention describes the motor 211 using the 3-phase AC power supply, but is not limited thereto. Therefore, the motor can use the 3-phase AC power supply.

The communication among the HCU 240, the motor controller 213, the BMS 250, the EMS 290, the control unit 270, or the like, may generally use the controller area network (CAN) method, but the exemplary embodiment of the present invention is not limited thereto. Therefore, another communication method can be used.

The bidirectional charger 260 receives commercial electricity from the outlet 111 by using the bidirectional connector 261 so as to serve to supply voltage to the high-voltage battery 230 or supply the reactive power of the high-voltage battery 230 to the power factor monitoring controller (170 of FIG. 1).

The control unit 270 is configured by a micom and includes an algorithm that receives the driving control information of the engine 210 or the motor 211 from the EMS 290 and receives the battery status information of the high-voltage battery 230 from the BMS 250 to determine whether the reactive power of the high-voltage battery 230 is transmitted to the power factor monitoring controller (170 of FIG. 1) based on the information. In addition, the control unit 270 is configured to include a memory (not shown) for implementing the algorithm.

The memory may be a memory that is included in the control unit 270 and may be a separate battery. Therefore, the memory may be a nonvolatile memory, such as a hard disk drive, a flash memory, an electrically erasable programmable read-only memory (EEPROM), a static RAM (SRAM), a ferro-electric RAM (FRAM), a phase-change RAM (PRAM), a magnetic RAM (MRAM), or the like.

A communication unit 280 serves to communicate between the control 270 and the power factor monitoring controller (170 of FIG. 1). To this end, the communication 280 may be the power line control (PLC) and the controller area network (CAN) but is not limited thereto and can use the wireless communication such as infrared communication (IrDA), Bluetooth, or the like.

In addition, although not shown in FIG. 2, a power battery (not shown) is configured to supply power to the inverter 220, the HCU 240, the BMS 250, or the like.

Figure 3:
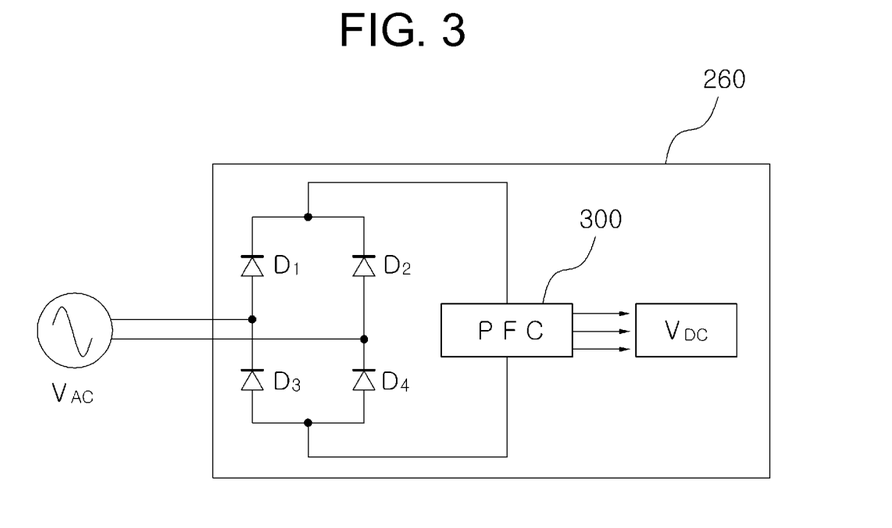
FIG. 3 is a circuit configuration diagram of a bidirectional charger shown in FIG. 1.

FIG. 3 is a circuit configuration diagram of the bidirectional charger shown in FIG. 1. In particular, the bidirectional charger 260, which is an on-board charger, serves to convert the AC power to the DC power. Referring to FIG. 3, power voltage $V_{AC}$ passes through an AC bridge rectifier 301 configured by a plurality of diodes D1 to D4 and is converted into output voltage power $V_{DC}$ having a DC type while passing through the PFC circuit 300.

Therefore, the bidirectional charger 260 serve to convert the AC power input from the micro-grid (180 of FIG. 1) into the DC power and supply the DC power to the high-voltage battery (230 of FIG. 2) or convert the DC power output from the high-voltage battery 230 to the AC power.

Figure 4:
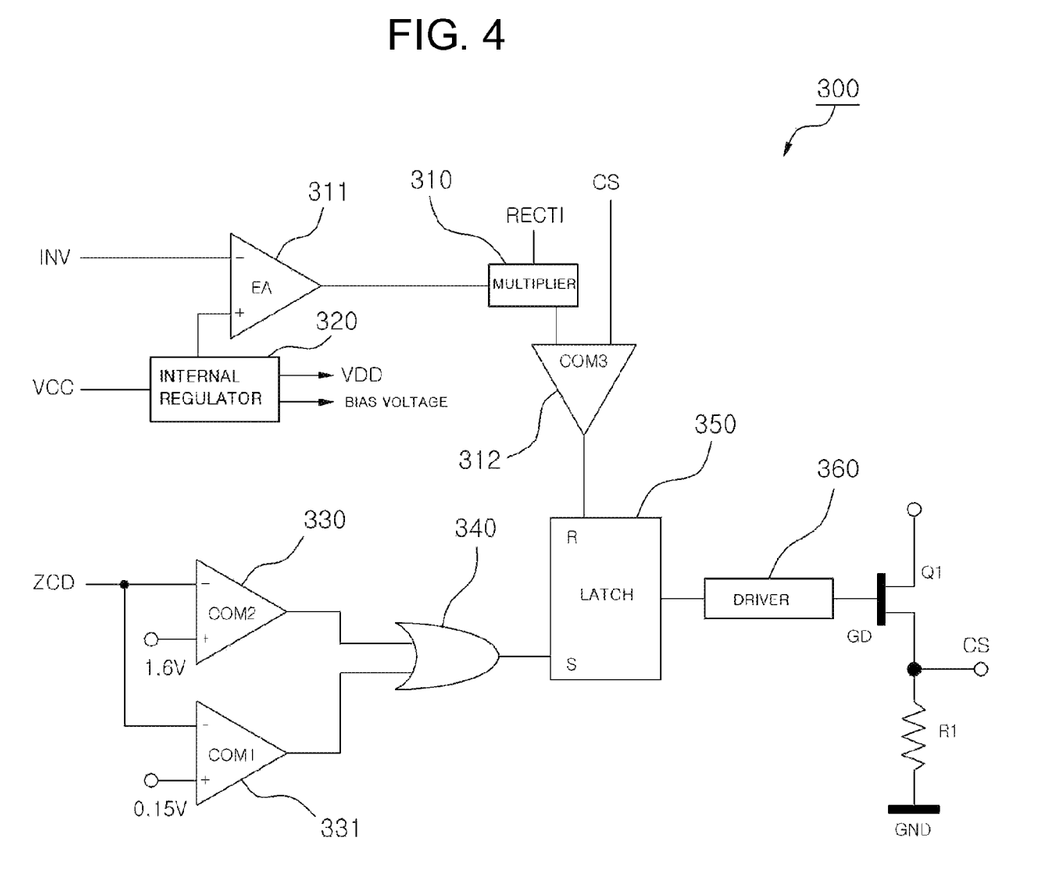
FIG. 4 is a circuit configuration diagram of a power factor control (PFC) circuit shown in FIG. 3.

Here, the PFC circuit 300 is generally configured in a switching regulator form and the exemplary embodiment of the present invention showing the same is shown in FIG. 4. Further, FIG. 4 shows a type of the switching regulator but the exemplary embodiment of the present invention is not limited thereto.

FIG. 4 is a circuit configuration diagram of the power factor control (PFC) circuit shown in FIG. 3. Referring to FIG. 4, the PFC output voltage (INV) is fedback so as to be input to an error amplifier (EA). Therefore, as shown in FIG. 3, the output voltage VCC is input to an internal regulator 320 and the internal regulator 320 generates power voltage VDD and bias voltage.

The voltage VDD (bias voltage) generated from the internal regulator 320 serves to the bias voltage and the reference voltage of comparators 312, 330, and 331 and the error amplifier 311. A signal RECTI rectified through the AC bridge rectifier 301 and an output signal of the error amplifier 311 are input to a multiplier 310 and an output signal from the multiplier 310 and a CS signal are input to the comparator 312. Therefore, the output signal from the comparator 312 is input to a reset terminal R of a latch 350.

In this configuration, the CS signal means the change in current according to a turn on/off signal of a power switch Q1.

Further, a ZCD signal compares the power current (for example, output power output from a transformer, or the like) with the output of the multiplier 310 to turn on a power switch Q1 and the signal input to the reset R of the latch 350 serves to turn off the power switch Q1 at a point where the current of the inductor (not shown) contacts the output signal of the multiplier 310 to reduce the inductor current to 0.

In addition, the power switch Q1 is turned-on by the reset signal to input the ZCD signal to the comparators 330 and 331 when the current of the inductor becomes 0 and then, the comparators 330 and 331 compare the ZCD signal with predetermined voltage (1.6V, 0.15V). Meanwhile, the comparison results are input to a summer 340 so as to be a set signal and the set signal is transferred to a set S of the latch 350. Therefore, a driver 360 receiving the signal from the latch 350 turns on the power switch Q1 to increase the current of the inductor (not shown).

Therefore, the PFC circuit 300 continues to monitor the current input toward the car (100 of FIG. 1) from the microgrid (180 of FIG. 1) to follow the input voltage waveform of the AC bridge rectifier 301, so that the phases of voltage and current are the same.

The PFC circuit has been known in advance and therefore, the description thereof will be omitted for easy understanding of the present invention.

Figure 5:
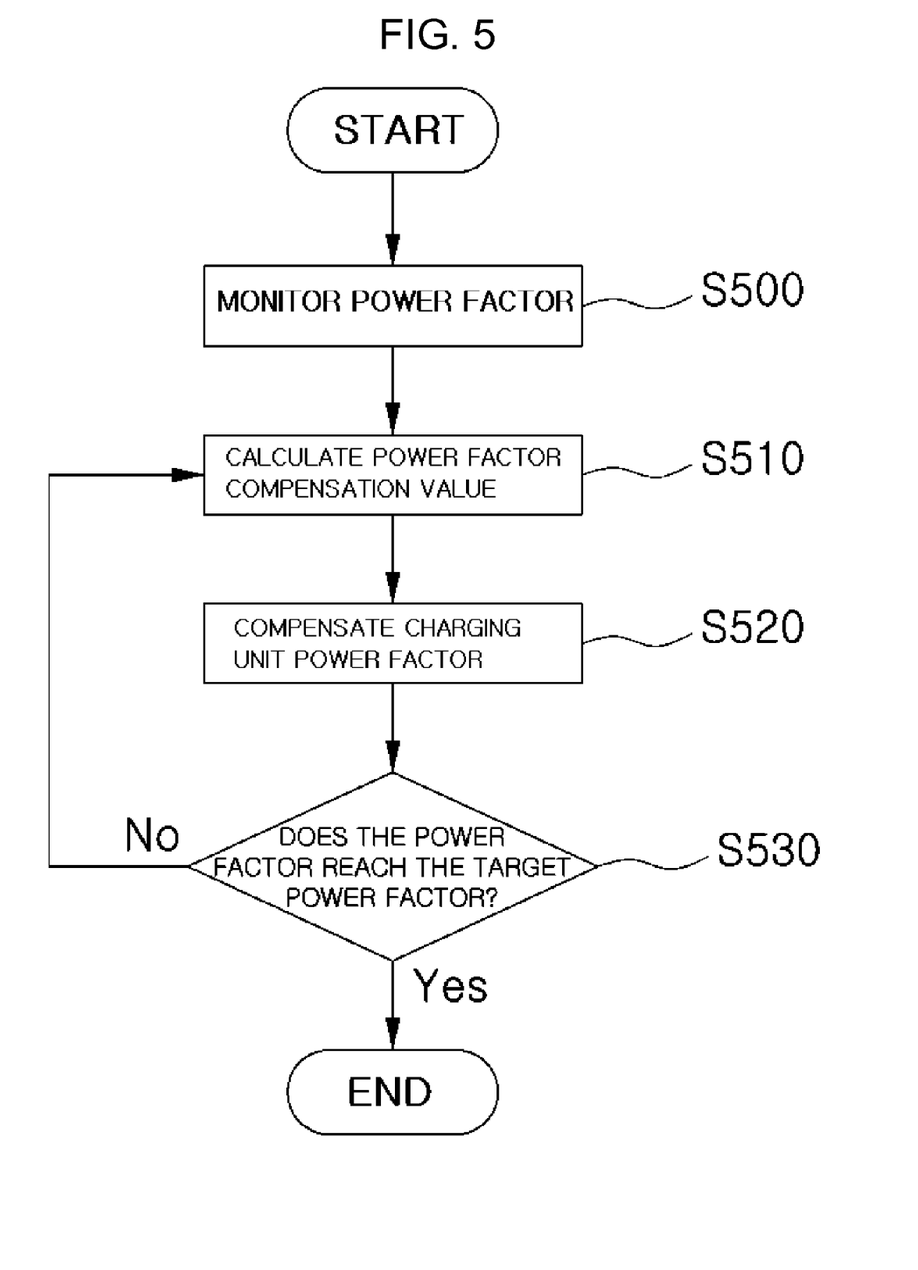
FIG. 5 is a flow chart showing a power factor compensation process according to the exemplary embodiment of the present invention.

FIG. 5 is a flow chart showing a power factor compensation process according to the exemplary embodiment of the present invention. Referring to FIG. 5, the power factor monitoring controller (170 of FIG. 1) monitors the power factor according to loads such as home appliances (113 of FIG. 1) in the home (110 of FIG. 1), the car (100 of FIG. 1) (S500).

As the monitoring result of the power factor, a power factor compensation value is calculated (S510). In other words, the home appliances (113 of FIG. 1) used in the home include disposable circuit devices such as a coil circuit, or the like, and therefore, Korea Electric Power Corporation should send 12 KW even though consumption power needed in the home appliances 113 is 10 KW. Therefore, when the car (100 of FIG. 1) compensates the power factor compensation value by compensating the power factor compensation value, Korea Electric Power Corporation does not need to send 12 KW.

For easy understanding, when the power factor is 1, it means that the supplied power is completely used for works and when the power factor is 0, it means that the supplied power is completely lost during the power transmission. Therefore, when the power factor is reduced, the power factor is corrected so as to increase the use efficiency of power, which is referred to as power factor correction. The correction method uses a method that increases the power factor by reducing the phase difference between current and voltage by providing capacitance component in which the current phase leads the voltage phase when the current phase lags the voltage phase due to a coil and reactance component.

Further, although the exemplary embodiment of the present invention describes that the power factor in the home is improved, the exemplary embodiment of the present invention can send the reactive power to the micro-grid (180 of FIG. 1) through the power factor monitoring controller 170.

When the power factor compensation value is calculated, the charging operation unit included in the car (100 of FIG. 1) compensates for the power factor compensation value (S520). In other words, the control unit (270 of FIG. 2) receives the power factor compensation value calculated in the power factor monitoring controller (170 of FIG. 1) to calculate the power factor compensation value and sends the reactive power corresponding to the power factor compensation value to the power factor monitoring controller (170 of FIG. 1) from the high-voltage battery (230 of FIG. 2).

After the power factor compensation value is compensated, the power factor monitoring controller 170 monitors the power factor to determine whether the power factor reaches the targeted power factor (S530).

As the determination result, if it is determined that the power factor reaches the targeted power factor value, the control unit (200 of FIG. 2) does not send the reactive power to the power factor monitoring controller (170 of FIG. 1).

On the other hand, when the power factor does not reach the targeted power factor value, S510 to S530 are repeatedly performed.

Therefore, it is possible to improve the power factor in the home by using the battery power supply of the electric car as the leading load. That is, the same effect as mounting the power compensation supply source, such as the flexible AC transmission (FACTS), in the load stage in the home can be obtained.

In addition, it is possible to send power to the micro-grid (180 of FIG. 1) by using the battery power supply of the electric car as the leading load.

As set forth above, the exemplary embodiments of the present invention can improve the power factor of the grid by performing the leading operating using the inverting duty control when the electricity of the electric car battery is supplied to the grid, thereby the grid to supplement the shortage of the reactive power through the battery.

In addition, the exemplary embodiments of the present invention can increase the grid stability by supplying and absorbing the reactive power to and in the micro-grid using the electric car battery.

What is claimed is:

1. A system for providing reactive power using the batteries in vehicles, comprising:
    a high-voltage battery for a car connected with outlets mounted in a home, the car being one of a hybrid car, a plug-in hybrid car, and an electric car;
    a power factor monitoring controller mounted in the home, the power factor monitoring controller connected to the high-voltage battery through the outlets and to at least one home appliance through the outlets, the power factor monitoring controller receiving status information on the high-voltage battery generated from a battery management system (BMS) included in the car through a communication unit included in the car, the power factor monitor controller monitoring a power factor for the at least one home appliance mounted in the home and the high-voltage battery, the power factor monitoring controller calculating a power factor compensation value based on the monitored power factor;
    a bidirectional charger included in the car, the bidirectional charger supplying power from a micro-grid to the high-voltage battery or sending power from the high-voltage battery to the micro-grid, the bidirectional charger including a power factor control (PFC) circuit; and
    a control unit controlling, based on the status information, the bidirectional charger to send power from the high-voltage battery to the micro-grid as a leading load by an amount indicated by the calculated power factor compensation value, thereby compensating for the power as much as the power factor compensation value indicates.

2. A method for providing reactive power using the batteries in vehicles, comprising:
    connecting a high-voltage battery for a car with outlets mounted in a home, the car being one of a hybrid car, a plug-in hybrid car, and an electric car;
    receiving, by the power factor monitoring controller, status information on the high-voltage battery generated from a battery management system (BMS) included in the car through a communication unit included in the car;

monitoring, by the power factor monitoring controller, a power factor for at least one home appliance mounted in the home and the high-voltage battery, the power factor monitoring controller mounted in the home, the power factor monitoring controller connected to the high-voltage factor and the at least one home appliance through outlets mounted in the home;

calculating a power factor compensation value based on the monitored power factor;

supplying power from a micro-grid to the high-voltage battery or sending the power from the high-voltage battery to the micro-grid by a bidirectional charger that is an on-board charger and includes a power factor control (PFC) circuit; and controlling, by a control unit, a bidirectional charger to send the power from the high-voltage battery to the micro-grid as a leading load by an amount corresponding to the calculated power factor compensation value, thereby compensating for the power as much as the power factor compensation value indicates.

* * * * *